United States Patent [19]

Coffey et al.

[11] Patent Number: 4,609,722

[45] Date of Patent: Sep. 2, 1986

[54] PROCESS FOR PREPARING SUBSTANTIALLY LINEAR POLYAMIDE FROM N-ALKYLAMIDE-SUBSTITUTED AMINE AND AQUEOUS AMMONIA

[75] Inventors: Gerald P. Coffey, Lyndhurst; Benedict S. Curatolo, Bedford Hts.; Robert Sanitra, Stow, all of Ohio

[73] Assignee: The Standard Oil Company, Cleveland, Ohio

[21] Appl. No.: 739,575

[22] Filed: May 30, 1985

Related U.S. Application Data

[63] Continuation of Ser. No. 260,492, May 4, 1981, abandoned.

[51] Int. Cl.$^4$ ............................................. C08G 69/00
[52] U.S. Cl. .................................. 528/315; 528/310; 528/323; 528/325; 528/328; 528/363
[58] Field of Search ............... 528/310, 323, 325, 315, 528/328, 363

[56] References Cited

U.S. PATENT DOCUMENTS

| | | | |
|---|---|---|---|
| 3,526,608 | 9/1970 | Berg et al. | 528/310 |
| 3,578,643 | 5/1971 | Wood et al. | 528/310 |
| 3,580,891 | 5/1971 | Ranier | 528/355 |
| 3,715,339 | 2/1973 | Ranier | 528/328 |
| 3,817,943 | 6/1974 | Lee et al. | 528/310 |
| 4,536,566 | 8/1985 | Coffey | 528/310 |

*Primary Examiner*—Harold D. Anderson
*Attorney, Agent, or Firm*—David P. Yusko; John E. Miller; Larry W. Evans

[57] ABSTRACT

N-alkylamide-substituted amines, such as nitrilotripropionamide, are either self-polymerized or copolymerized with other monomers, such as amino acids, in the presence of a stoichiometric amount of aqueous ammonia and at a temperature of at least 200° C. and autogenous pressure to form substantially linear polyamides, such as poly-$\beta$-alanine and nylon-3/6.

12 Claims, No Drawings

PROCESS FOR PREPARING SUBSTANTIALLY LINEAR POLYAMIDE FROM N-ALKYLAMIDE-SUBSTITUTED AMINE AND AQUEOUS AMMONIA

This is a continuation of application Ser. No. 260,492 filed May 4, 1981, now abandoned.

BACKGROUND OF THE INVENTION

1. Field of the Invention

This invention relates to polyamides. In one aspect, the invention relates to substantially linear polyamides prepared from N-alkylamide-substituted amines while in another aspect, the invention relates to a process for preparing these polyamides in the presence of aqueous ammonia.

2. Description of the Prior Art

Matlack, U.S. Pat. No. 2,672,480, and Breslow, U.S. Pat. No. 2,749,331, teach the preparation of synthetic, substantially linear polyamides, such as poly-$\beta$-alanine, by contacting an amide containing at least one activated ethylene double bond and an active hydrogen atom, such as acrylamide, with a strongly basic catalyst, such as an alkali metal hydroxide, under substantially anhydrous conditions. Wexler, U.S. Pat. No. 3,422,081, extends this process to preparing highly crystalline, substantially linear, stereoregular polymers of methacrylamide by polymerizing the monomer in the presence of a catalyst system comprising a combination of an alkali metal alkoxide and a polyvalent metal salt.

Other methods for preparing polyamides are also known. Hill, U.S. Pat. No. 2,274,831, teaches the manufacture of polyamides by polymerizing amino acids containing as a heteroatom a tertiary amino nitrogen or by reacting diamines and dibasic acids, either or both of which contain a heteroatom of tertiary amino nitrogen. These reactants can form interpolyamides with other materials, such as 6-aminocaproic acid. Graf et al, U.S. Pat. No. 3,093,618, teach a method for the manufacture of polyamides derived from $\alpha$-aminocarboxylic acids where the monomer is polymerized at an elevated temperature and preferably in the presence of an accelerator, such as dimethyl formamide. Both Kobayashi et al, U.S. Pat. No. 3,499,879, and Volker et al, U.S. Pat. No. 3,629,203, teach an aqueous process for preparing a polyamide from acrylonitrile. Still other methods for preparing polyamides are known.

SUMMARY OF THE INVENTION

According to this invention, substantially linear polyamides are prepared by a process comprising contacting a first monomer of the formula

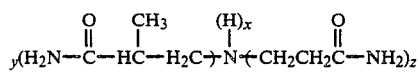

(I)

with a second monomer selected from the group consisting of:

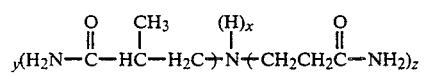

(I)

$$CH_2=C(R)-C(O)-NH_2 \quad (II)$$

-continued $$CH_2=C(R)-C(O)-NHR' \quad (III)$$

$$R''NH_2 \quad (IV)$$

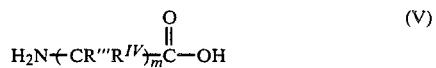

(V)

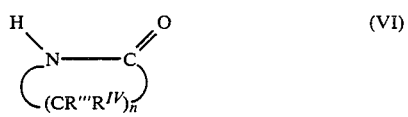

(VI)

where
R is a hydrogen or methyl radical,
R' is a $C_1$–$C_{12}$ alkyl radical,
R'' is a $C_1$–$C_{20}$ aliphatic, $C_4$–$C_8$ cycloaliphatic, or an aromatic radical,
R''' and $R^{IV}$ are independently a hydrogen or a $C_1$–$C_4$ alkyl radical,
m is an integer of 1–11,
n is an integer of 2–11,
x is an integer of 0–2
y is an integer of 0–3,
z is an integer of 0–3, and
$x+y+z=3$ in a molar ratio of about 1:1 to about 9:1 in the presence of at least a stoichiometric amount, based on the combined moles of the monomers, of aqueous ammonia at a temperature of at least about 200° C. and autogenous pressure. This invention is particularly useful for preparing poly-$\beta$-alanine from nitrilotripropionamide and does so without the need for either anhydrous solvents or strongly basic catalysts. Polyamide yields are good and relatively high molecular weights can be achieved.

DETAILED DESCRIPTION OF THE INVENTION

Monomers

The monomers of formula I are the Michael adducts of acrylamide and/or methacrylamide and ammonia and include such materials as:

| Monomer | Variable | | |
|---|---|---|---|
| | x | y | z |
| $\beta$-aminopropionamide | 2 | 0 | 1 |
| $\beta$-amino-$\alpha$-methylpropionamide | 2 | 1 | 0 |
| iminodipropionamide | 1 | 0 | 2 |
| iminodi-$\alpha$-methylpropionamide | 1 | 2 | 0 |
| nitrilotripropionamide | 0 | 0 | 3 |
| nitrilotri-$\alpha$-methylpropionamide | 0 | 3 | 0 |
| $\beta$-(N—propionamide) amino-$\alpha$-methyl proprionamide | 1 | 1 | 1 |

These adducts are readily prepared by contacting acrylamide and/or methacrylamide with aqueous ammonia at a slightly elevated temperature, e.g. 25° C.–100° C. This preparation will generally yield a mixture of mono-, di- and tri-adducts with the latter typcially being the predominate component. This mixture can be used per se as a starting material for this invention or if desired, it can be separated into its various components, one or some combination of which can then be used as the starting material. These monomers can also be prepared by other methods.

The monomers of formula II are but two, acrylamide and methacrylamide. Both these materials are well known in the art and need no further description here.

The monomers of formula III–VI are N-alkylacrylamides, primary amines, amino acids and lactams, respectively. R' of formula III can be a primary, secondary or tertiary alkyl radical and typically contains between 1 and 12 carbon atoms, preferably between 1 and 8 carbon atoms.

R" in formula IV is preferably a $C_1$–$C_{12}$ alkyl, $C_6$–$C_7$ cycloalkyl or a phenyl radical. Exemplary R" radicals include methyl, ethyl, n-propyl, isopropyl, n-butyl, sec-butyl, t-butyl, octyl, dodecyl, cyclopentyl, cyclohexyl, cyclooctyl, phenyl, biphenyl, naphthyl, and the like.

R''' and $R^{IV}$ in formulae V and VI are typically primary, lower ($C_1$–$C_4$) alkyl radicals or hydrogen. "Independently" here means that R''' and $R^{IV}$ can either be the same or different, e.g. both hydrogen or one hydrogen while the other an alkyl radical. Preferably, both are simultaneously hydrogen.

Amino acids where "m" is a number of about 4–11 and lactams where "n" is a number of about 4–11 are preferred to the other amino acids and lactams. Particularly preferred amino acids are 6-aminocaproic, 11-aminoundecanoic and 12-aminododecanoic acids and a particularly preferred lactam is ε-caprolactam.

All the monomers of formulae I–VI can bear inert substituents, i.e. substituents that are essentially nonreactive with the process reagents and products at process conditions. Typically the monomers are free of such substituents.

Polyamide Products

The polyamides prepared from the monomers of this invention include both homo- and copolymers. A homopolymer is formed when the first and second monomers are:

(a) both defined by formula I and either y or z is zero, or (b) defined by different formulae but the first monomer is a Michael adduct (mono-, di- or tri-) of ammonia and a second monomer of formula II while the second monomer is the formula II monomer used to make the first monomer.

For example, the homopolymer of poly-β-alanine (also known as poly-β-propionamide and nylon-3) is formed when:

(1) both monomers are nitrilopropionamide;

(2) the first monomer is nitrilotripropionamide and the second monomer is iminodi- and/or β-aminopropionamide, or the first monomer is iminodi- and/or nitrilotripropionamide and the second monomer is β-aminopropionamide, or etc.; or (3) the first monomer is nitrilotri-, iminodi- and/or β-aminopropionamide and the second monomer is acrylamide.

A similar scheme can be described for the formation of poly(α-methyl-β-alanine) from (a) the Michael adducts of methacrylamide and ammonia alone or (b) a Michael adduct of methacrylamide and ammonia with methacrylamide as the second monomer.

A copolymer is formed when the first and second monomers are:

(a) both defined by formula I but both y and z are at least one in the formula of one or both monomers, or (b) defined by different formulae and the first monomer is a Michael adduct of ammonia and a second monomer of formula II but the second monomer is not the formula II monomer used to make the first monomer. Examples of the various copolymers that can be formed by this invention include those derived from the reaction of:

(1) a first and second monomer of the formula

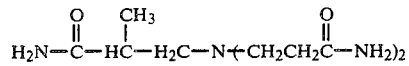

(2) a first monomer of the formula

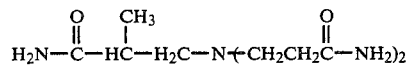

and nitrilotripropionamide; or (3) nitrilotri-, iminodi- and/or β-aminopropionamide and one or more of methacrylamide, N-t-butylacrylamide, N-t-octylacrylamide, methylamine, ethylamine, cyclohexylamine, aniline, 6-aminocaproic acid, ε-caprolactam, etc.

These copolymers are known generally as nylon-3/X and α-methyl nylon-3/X where the nylon-3 and α-methyl nylon-3 segments are derived from the first monomer and the X segment is derived from the second monomer.

The polyamides prepared by this invention are substantially linear homo- and copolymers which means that these polyamides, particularily those of relatively high molecular weight, can have some cross-linkages present. However, the number of these cross-linkages is generally negligible.

The properties of these polyamides will obviously vary depending upon the monomer polymerized and the molecular weight of the polyamide. Reaction conditions can be varied to obtain different molecular weights of the same monomer and various monomers can be matched with one another to obtain desired physical characteristics, such as melt point. For example, nylon-3 is difficult to melt-spin into filament. However, by introducing an N-alkylacrylamide into the nylon-3 system as a comonomer, the resulting polyamide will have a lower melting point and processing temperature so that the resulting copolymer can be melt spun. Such a consideration is important in some commercial applications.

Aqueous Ammonia

The hallmark of this invention is the use of aqueous ammonia to promote the polymerization of the various monomers. Historically, the strong base, e.g. sodium t-butoxide, catalyzed reaction had to be conducted under anhydrous conditions to avoid inactivating the catalyst. However, aqueous ammonia (a weak base), when used at the conditions later defined, readily promotes the formation of substantially linear polyamides without significant product degradation. The aqueous ammonia can be introduced in any suitable manner, but concentrated ammonium hydroxide is typically used for reasons of convenience. Although stoichiometric amounts are employed, the aqueous ammonia is actually catalytic in as much as it is not consumed during the reaction. This is another advantage of the invention in that the aqueous ammonia can be recycled or continuously used while requiring little, if any, make-up.

Process Conditions

The relative amounts of first (formula I) and second (formulae II–VI) monomer that can be used in the practice of this invention can vary widely. Typically, the first:second monomer mole ratio is of about 1:1 to about 9:1, and preferably of about 3:1 to about 4:1. When the first and/or second monomer is a mixture of two or more compounds, e.g. the first monomer is a mixture of nitrilotri-, iminodi- and $\beta$-aminopropionamide, the number of moles of monomer (as used in the above monomer mole ratios) is the total number of moles in the monomer mixture. Usually the second monomer is a single compound and not a mixture. Obviously when a homopolymer is being prepared, a first and second monomer mole ratio has little or no significance.

At least a stoichiometric amount of aqueous ammonia, i.e. ammonium hydroxide, is necessary for the practice of this invention, but typically about a 10% molar excess is used. By stoichiometric amount is here meant that one mole of aqueous ammonia is required for each mole of reactants (first monomer plus second monomer). Although stoichiometric amounts are employed, the aqueous ammonia is a catalyst in as much as it is not consumed and is completely recovered at the completion of the process save for incidental amounts lost to the inefficiencies common to all processes. Use of an excess of aqueous ammonia helps ensure complete reaction of the monomers.

The temperature and pressure at which this process is conducted can vary over a wide range and will vary over the course of the reaction. The exact temperature employed at any given point in the reaction will depend upon such factors as the monomers being reacted, the presence or absence of a catalyst, the nature of the solvent (if any), the degree of polymerization desired, etc. However, at some point in the reaction the reactants are exposed to a set of confined conditions, i.e. typically to a temperature of about 190° C. to about 250° C., preferably of about 200° C. to about 230° C., and autogenous pressure (that produced by the system itself). Operating this invention at temperatures lower than 190° C. generally favors reactions that produce products other polyamides while operating at temperatures higher than 250° C. generally does not result in any decided advantage.

The confined conditions described above need not be employed over the entire course of the reaction. Typically, it is advantageous to contact the reactants at temperatures and pressures lower than that described above for the first part of the reaction, gradually building to the confined conditions. During this preheat the ammonium hydroxide should be present to avoid or minimize any vinyl polymerization of the monomers. The reaction is then conducted at the confined conditions for a period of time (during which the ammonium hydroxide should also be present) and then the conditions gradually removed until the reaction is at a temperature and pressure at which the reaction products can be conveniently recovered. The amount of time to complete the entire reaction will vary depending upon a whole host of factors including the kind of polymerization used, i.e. bulk or solution, size of the reaction mass, nature of the reactants, etc., but typically confined conditions are employed over the majority of the reaction time. At bench scale, the exposure time to the confined conditions can range from a few minutes to more than a day but is typically between 1 and 19 hours.

This reaction employs an aqueous medium and thus has no need for organic solvents. However, if the use of a solvent is desired, any solvent that has a fair degree of miscibility with water can be employed. Likewise, the use of an inhibitor for the suppression of free-radical polymerization is desirable and any of the well known inhibitors may be employed, such as N-phenyl-$\beta$-naphthylamine, p-methoxyphenol, hydroquinone, quinone, etc. The amount of inhibitor used will also vary, but generally is within the range from about 0.005 to about 1.0 wt.% based upon the total weight of the monomers.

The polyamides produced by this invention are recoverable from the reaction mass by conventional techniques. Usually this involves filtering and drying and subsequent processing of the product into a state suitable for its intended use. The uses for these polyamides are many and varied and will depend, at least to some degree, upon the ultimate molecular weight of the polymer. Another important consideration in the end-use of these polymers is the nature of the polymer, i.e. the physical properties associated with it derived at least in part from the monomers that were used to prepare it. When copolymers are prepared, particularly those from one of the propionamide monomers and one monomer of formulae II–VI, the polymer has a lower melting point and processing temperature than poly-$\beta$-alanine and this then reduces the use of expensive and troublesome solvent spinning or casting techniques required for processing the polymers. Poly-$\beta$-alanine undergoes degradation at a temperature of about 330°–340° C. and thus does not lend itself well to melt-spinning processing. Modified poly-$\beta$-alanine, i.e. the copolymer derived from a propionamide monomer and some monomer of formulae II–VI, has a melt point below 330°–340° C. and thus is more suitable for melt-spinning processing.

The following examples are illustrative of certain specific embodiments of this invention. Since glassware was used as the reaction vessel, a pressure release valve set at 40 psi was employed for safety considerations. All vacuums applied were about 2 mm of Hg or less and all melting ranges were determined on a Fisher-Johns melting point apparatus. The melting range was defined by the disappearance of crystallites, the upper limit of the range being the temperature at which the polymer had became totally transparent. Water solubility of all products was determined by the use of a Soxhlet extractor (over 16 hours). Unless otherwise noted, all parts and percentages are by weight.

SPECIFIC EMBODIMENTS

Example 1

Preparation of Nitrilotripropionamide

A Parr autoclave was charged with an aqueous solution of acrylamide and a 10% molar excess of aqueous ammonia. The resulting mixture was warmed to 65° C. and autogenous pressure (<50 psi) and stirred at these conditions for three hours. At the end of this period, the reaction mass was allowed to cool to room temperature and white, crystalline nitrilotripropionamide (melting range 184°–186° C.) was recovered. NMR spectroscopy confirmed the structure.

Example 2

Preparation of Nylon-3

A 100 ml round-bottom flask was charged with nitrilotripropionamide (15.33 g), hydroquinone monomethyl ether (0.154 g), and 29% ammonium hydroxide (8.60 g). The flask was sealed and heated at 150° C. for 16 hours. The temperature of the flask was then raised to 200° C. and held there for two hours (releasing pressure above 40 psi through the pressure relief value) after which a vacuum was applied for an additional three hours. A light white-yellow solid 13.74 g, 96.3% yield) was recovered.

IR and NMR spectroscopy showed the solid to have the nylon-3 structure. Water insolubility was 94%. The melting range of the crude product was 333°–340° C. with decomposition and the water insoluble fraction melted over 335°–338° C. with decomposition.

EXAMPLES 3–5

Preparation of Nylon-3/X

A 100 ml round-bottom flask was charged with equimolar quantities of nitrilotripropionamide (NTP) and a second monomer X, a 10% molar excess (with respect to NTP) of 29% aqueous ammonia, and 1 wt.% (also with respect to NTP) of hydroquinone monomethyl ether. The flask was sealed, placed in a cage, and heated in a oil bath at 150° C. for 16 hours. The flask was then fitted with a 40 psi pressure release valve and the heating continued for an additional 2 hours at 200° C. followed by three more hours at this temperature but now under vacuum. Yellowish-white, opaque solids were recovered and their properties are reported in the Table.

TABLE

| Ex. | Monomer X | % H$_2$O Insolub. | Melting Range(°C.) | Melting Range-I(°C.)[1] | Product Comp.[2] |
|---|---|---|---|---|---|
| 3 | Methylacrylamide | 65.7 | 295–310* | 308–315* | 90/4 |
| 4 | 6-Aminocaproic acid | 57.2 | 268–271 | 294–295 | 81/19 |
| 5 | ε-Caprolactam | 43.6 | 250–252 | 259–269 | 74/26 |

[1]Melting range of insoluble fraction.
[2]Product composition in mole percent as determined by NMR. The numerator represents the mole percent of the copolymer derived from NTP and the denominator represents the mole percent derived from X.
*With decomposition.

Although this invention has been described in considerable detail by the preceding examples, these examples are for the purpose of illustration only and many variations and modifications can be made by one skilled in the art without departing from the spirit and scope of the appended claims.

What is claimed is:

1. A process for preparing a substantially linear polyamide, the process comprising contacting a first monomer of the formula

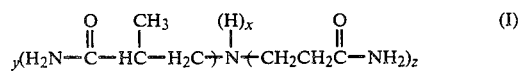

with a second monomer selected from the group consisting of:

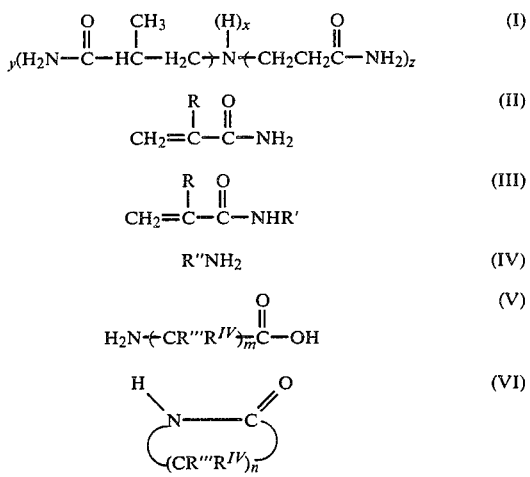

where
R is a hydrogen or methyl radical,
R' is a $C_1$–$C_{12}$ alkyl radical,
R" is a $C_1$–$C_{20}$ aliphatic, $C_5$–$C_8$ cycloaliphatic, or an aromatic radical,
R''' and $R^{IV}$ are independently a hydrogen or a $C_1$–$C_4$ alkyl radical,
m is an integer of 1–11,
n is an integer of 2–11,
x is an integer of 0–2
y is an integer of 0–3,
z is an integer of 0–3, and
$x+y+z=3$, in a molar ratio of about 1:1 to about 9:1 in the presence of at least a stoichiometric amount, based on the combined moles of the monomers, of aqueous ammonia at a temperature of at least about 200° C. and autogenous pressure.

2. The process of claim 1 where both the first and second monomers are of formula I.

3. The process of claim 2 where one of y and z is zero.

4. The process of claim 2 where y is zero.

5. The process of claim 4 where both the first and second monomers are nitrilotripropionamide.

6. The process of claim 1 where the second monomer is of formula II.

7. The process of claim 6 where the first monomer is of formula I and y is zero and the second monomer is acrylamide.

8. The process of claim 1 where the second monomer is selected from the group consisting of formulae III–VI.

9. The process of claim 8 where R' is a $C_1$–$C_8$ alkyl radical, R" is a $C_1$–$C_{12}$ alkyl, $C_6$–$C_7$ cycloalkyl or a phenyl radical, R''' and $R^{IV}$ are independently $C_1$–$C_4$ alkyl or hydrogen radicals and m and n are integers of 4–11.

10. The process of claim 9 where the second monomer is selected from the group consisting of N-t-butylacrylamide, N-t-octylacrylamide, methylamine, ethylamine, cyclohexylamine and aniline.

11. The process of claim 9 where the second monomer is selected from the group consisting of 6-aminocaproic acid, 11-aminoundecanoic acid, 12-aminododecanoic acid and ε-caprolactam.

12. The process of claim 2, 3, 4, 5, 6, 7, 8, 9, 10 or 11 where the aqueous ammonia is present in a molar excess based on the total moles of the first and second monomers.

* * * * *